United States Patent
Johnson et al.

(10) Patent No.: US 8,736,676 B2
(45) Date of Patent: May 27, 2014

(54) IMAGING BASED STABILIZATION

(75) Inventors: Samuel A. Johnson, Loveland, CO (US); Helen Greiner, Wayland, MA (US); Andrew Shein, Winchester, MA (US)

(73) Assignee: Cyphy Works, Inc., Danvers, MA (US)

( * ) Notice: Subject to any disclaimer, the term of this patent is extended or adjusted under 35 U.S.C. 154(b) by 361 days.

(21) Appl. No.: 13/079,106

(22) Filed: Apr. 4, 2011

(65) Prior Publication Data
US 2012/0249774 A1 Oct. 4, 2012

(51) Int. Cl.
*H04N 7/00* (2011.01)
*G06K 9/00* (2006.01)
*G01C 3/08* (2006.01)
*G01S 17/89* (2006.01)
*G01C 21/20* (2006.01)
*B64C 1/00* (2006.01)

(52) U.S. Cl.
CPC ............... *G01S 17/89* (2013.01); *G01C 21/20* (2013.01); *B64C 1/00* (2013.01)
USPC ........................... 348/113; 382/106; 356/5.05

(58) Field of Classification Search
USPC ............... 348/113, 144, 396, 143, 117; 353/5
See application file for complete search history.

(56) References Cited

U.S. PATENT DOCUMENTS

| | | | |
|---|---|---|---|
| 3,624,368 A * | 11/1971 | Close | 708/6 |
| 4,671,650 A * | 6/1987 | Hirzel et al. | 356/28 |
| 5,278,423 A * | 1/1994 | Wangler et al. | 250/559.4 |
| 5,488,468 A | 1/1996 | Kawanishi et al. | |
| 6,056,237 A * | 5/2000 | Woodland | 244/3.15 |
| 6,441,888 B1 * | 8/2002 | Azuma et al. | 356/4.01 |
| 6,618,123 B2 * | 9/2003 | Uomori et al. | 356/3.12 |
| 6,868,314 B1 * | 3/2005 | Frink | 701/3 |
| 6,922,632 B2 | 7/2005 | Foxlin | |
| 7,510,142 B2 | 3/2009 | Johnson | |
| 7,631,834 B1 | 12/2009 | Johnson et al. | |
| 2006/0115160 A1 | 6/2006 | Jung et al. | |
| 2007/0005199 A1 * | 1/2007 | He | 701/16 |
| 2007/0252035 A1 * | 11/2007 | Hubbard | 244/75.1 |
| 2008/0119970 A1 * | 5/2008 | Campbell et al. | 701/8 |
| 2009/0149994 A1 | 6/2009 | Kim et al. | |
| 2009/0177437 A1 | 7/2009 | Roumeliotis | |
| 2010/0030380 A1 | 2/2010 | Shah et al. | |
| 2010/0110412 A1 * | 5/2010 | Basu et al. | 356/3 |
| 2010/0157280 A1 * | 6/2010 | Kusevic et al. | 356/4.01 |
| 2011/0164783 A1 * | 7/2011 | Hays et al. | 382/100 |

FOREIGN PATENT DOCUMENTS

WO 2009/005875 1/2009

OTHER PUBLICATIONS

Wu, Allen D., et al. "Methods for Localization and Mapping Using Vision and Inertial Sensors" *Guidance, Navigation and Control Conference*, Aug. 18-21, Honolulu, Hawaii (2008) pp. 1-25.
DePiero et al., "3-D Computer Vision Using Structured Light: Design, Calibration, and Implementation Issues," Advances in Computers, vol. 43 (1996).
Hinkel et al., "A Rotating Laser Range Finder and Attached Data Interpretation for Use in an Autonomous Mobile Robot," Microprocessing and Microprogramming, 24 (1998) 411-418.

* cited by examiner

*Primary Examiner* — Sath V Perungavoor
*Assistant Examiner* — Peter D Le
(74) *Attorney, Agent, or Firm* — Occhiuti & Rohlicek LLP

(57) ABSTRACT

An image-based sensor system for a mobile unit makes use of light emitters and imagers to acquire illumination patterns of emitted light impinging on the floor and/or walls surrounding the unit. The illumination pattern is used to estimate location and/or orientation of the unit. These estimates are used for one or more functions of stabilization, calibration, localization, and mapping of or with respect to the unit.

22 Claims, 5 Drawing Sheets

IMAGING BASED STABILIZATION

BACKGROUND

This invention relates to stabilization using an imaging input.

Stabilization, calibration, localization, and mapping functions may be difficult in an interior environment, for example, because of the lack of reliable signals from a positioning system (e.g, a Global Positioning System), and because many inertial sensors suffer from characteristics such as signal drift.

One application is for use on an aerial vehicle that is designed to fly in interior environments. An example of such a vehicle is found in U.S. Pat. No. 7,631,834, issued on Dec. 15, 2009. There is a need to provide a sensor system for such an aerial vehicle that is small, lightweight, and cost effective.

SUMMARY

In one aspect, in general, a mobile part of an apparatus has a first light emitter for forming a first light emission. The first light emission includes emitted rays on a cone or cylinder that is symmetrical about a central axis of the mobile part. The mobile part includes a first imager for acquiring images from a point of view along the central axis showing an illumination pattern at intersections of the emitted rays and a first surface upon which the first light emission impinges. A first estimator of the apparatus is configured for processing the acquired images and using the acquired images to determine at least one of (a) an orientation of the central axis of the apparatus with respect to the first surface, and (b) a distance from the surface along the central axis.

Aspects may include one or more of the following features.

The mobile part comprises an aerial vehicle, and the apparatus further comprises a module configured to be responsive to the determined orientation and/or distance to perform at least one function from a group of functions consisting of stabilization, calibration, localization, and mapping.

The module responsive to the determined orientation and/or distance comprises a control system configured to generate control signals for flight controls of the aerial vehicle.

The control system is configured to be responsive to the determined orientation to stabilize an orientation of the vehicle.

The control system is configured to be responsive to the determined distance to stabilize an altitude of the vehicle above the surface.

The first light emitter comprises multiple optical elements disposed at a fixed radius perpendicular from a point on the central axis.

The multiple optical elements include multiple laser light sources.

The multiple optical elements include multiple reflectors, and the first light emitter further includes a laser light source configured to reflect rays off the reflectors to form the first light emission.

The estimator is configured to determine the orientation according to an eccentricity of the illumination pattern.

The estimator is configured to determine the distance according to a size of the illumination pattern.

The first light emitter includes a reflector configured to rotate about the central axis, and a laser light source configured to reflect a ray off the rotating mirror to form the rays on the cone that is symmetrical about the central axis.

The mobile part comprises an aerial vehicle having a propeller assembly configured to rotate about the central axis to provide lift for the aerial vehicle, and the reflector is coupled to the propeller assembly to rotate with the rotation of the propeller assembly.

The mobile part further includes a second light emitter for forming a second light emission comprising a plurality of emitted rays from the central axis of the mobile part. The mobile part also includes a second imager for acquiring images showing an illumination pattern at intersections of the emitted rays of the second light emission and one or more second surfaces upon which the second light emission impinges. The apparatus further includes a second estimator for processing the acquired images for the second imager and using the acquired images to determine a location of the mobile part relative to the one or more second surfaces.

The rays of the second emission are on a plane that is perpendicular to the central axis of the mobile part.

The second imager acquires images from one or more points of view that are displaced in the direction of the central axis from the plane of the rays of the second light emission.

The estimator is configured to determine the location relative to the surface according to a displacement of the displacement in the images acquired by the second imager of the illumination pattern in a direction corresponding to the central axis.

The second imager comprises a plurality of imagers disposed about the periphery of the mobile part, and wherein the second imager is configured to combine the images of the plurality of imagers to form an imaging including all directions extending from the central axis.

The second estimator is configured to be responsive to the location to perform at least one function from a group of functions consisting of stabilization, calibration, localization, and mapping.

The first estimator is implemented in the mobile part of the apparatus.

The mobile part comprises an aerial vehicle that is tethered to a control station, and wherein the first estimator is implemented at least in part at the control station.

In another aspect, in general, a method for calibrating a image-guided apparatus includes placing the apparatus in a calibration unit. The calibration unit has a substantially cylindrical inner surface and the apparatus is placed in the calibration unit to align a central axis of the apparatus with the central axis of the cylinder. A light emission is emitted from a light emitter affixed to the apparatus. The light emission comprises rays in a symmetrical pattern about the central axis. The rays impinge on the inner surface of the cylinder. Images are acquired from an imager affixed to the apparatus. The images show an illumination pattern at intersections of the emitted rays and the inner surface of the cylinder. An estimator of the apparatus is calibrated according to known dimensions of the calibration unit and the illumination pattern.

Aspects may have one or more of the following advantages.

Relatively inexpensive commercially available cameras can be used to acquire images of the laser illumination. The resolution of such cameras is sufficient such that the pattern of the illumination can be used in stabilization/control, mapping, and localization algorithms. The frame rate of available camera units is sufficient to provide measurement updates for such real-time algorithms.

An easily implemented calibration procedure, for instance using a calibrated cylindrical unit, allows the light emitters and imagers to be affixed to the mobile part without requiring precise placement.

An aerial vehicle can be stabilized using the approach, for example, incorporating the determined location, altitude, or orientation in a control loop.

Other features and advantages of the invention are apparent from the following description, and from the claims.

DESCRIPTION

Figure 1:
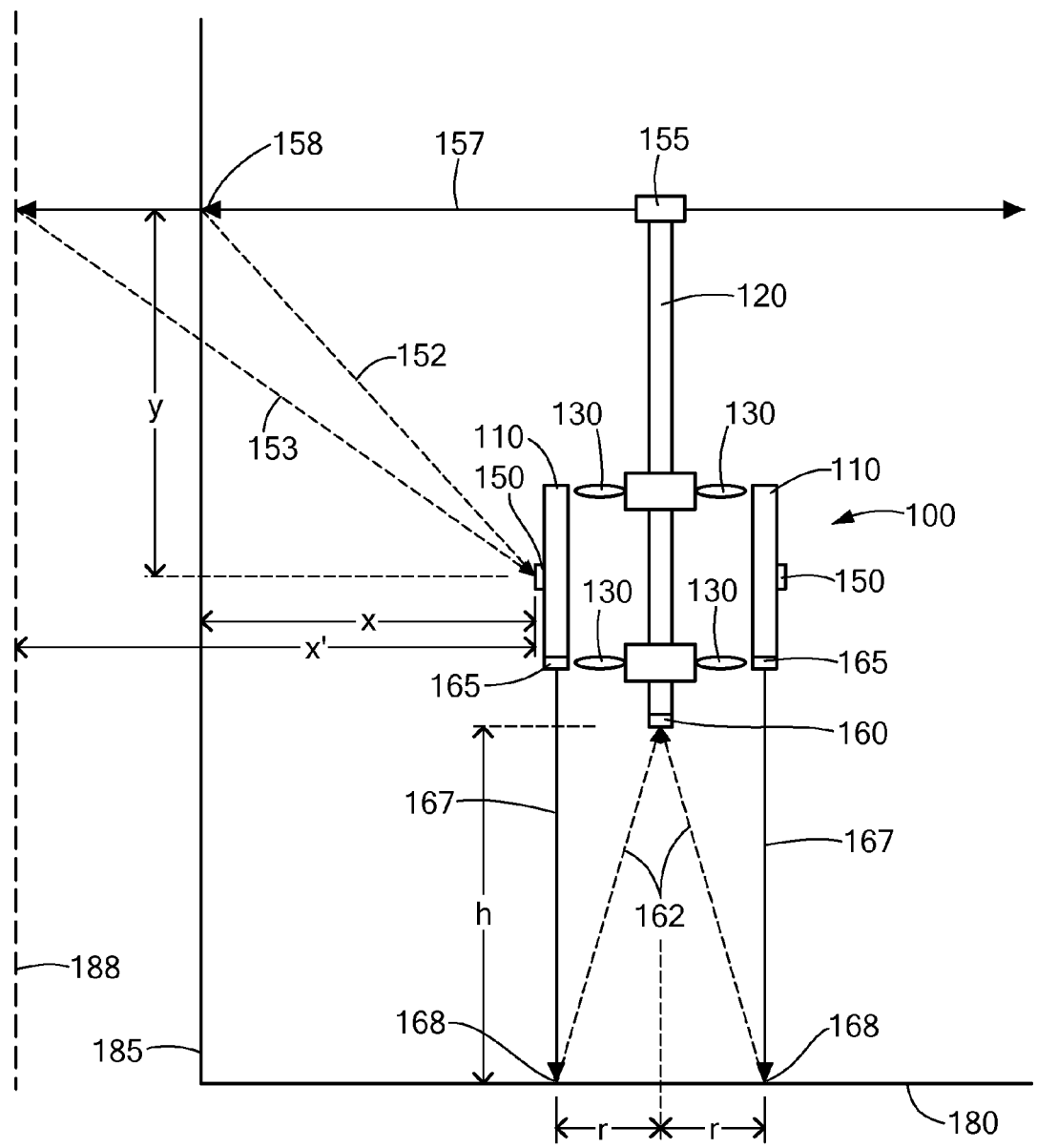
FIG. 1 is a side cross-sectional view of an aerial vehicle in a indoor environment.

Referring to FIG. 1 number of approaches to stabilization, calibration, and/or localization are described in the context of an aerial vehicle 100. In some embodiments, the vehicle 100 is similar to vehicles that are described in U.S. Pat. No. 7,631,834, "Aerial Robot with Dispensable Conductive Filament," issued on Dec. 15, 2009. In general, as described more fully later in this document, the vehicle includes a controller to maintain stability and to move in a controlled manner (e.g., according to a remote control or autonomously) based on sensor inputs that include inertial sensors that measure linear and rotational acceleration. This document describes use of optical sensing of the environment to provide additional inputs to the controller and/or for other uses including calibration of sensors, mapping of the environment and localization of the vehicle in the environment.

Generally, the vehicle 100 has body 110 with a generally cylindrical design that forms a duct through which fans 130 drive air through the duct to lift the vehicle. The vehicle 100 includes a number of control surfaces (not shown) that are adjusted by the controller to maintain stable controlled flight. The vehicle 100 is shown schematically in FIG. 1 with a central member 120 that extends along the axis of the vehicle.

The vehicle 100 shown in FIG. 1 includes a number of light emitters. Other embodiments may include fewer or more than those shown. A first light emitter 155 is mounted on the central axis of the vehicle and produces planar rays 157 that emit perpendicularly to the central axis in all directions. In some examples, the light emitter includes a laser source (e.g., 1-300 mW at 980 nm wavelength) coupled to a 360 degree line generator. Typically, the rays 157 impinge on a wall 185 illuminating a line 158 (shown in cross-section as a point in FIG. 1).

The vehicle includes an imager that is made up of a number of cameras 150 disposed around the peripheral surface of the vehicle, for example, with eight cameras being arranged around the vehicle so that in aggregate they provide a 360 degree acquisition angle. Two of the cameras are shown in cross-section in FIG. 1. As an illustration, the vehicle 100 is oriented with its central axis parallel to a wall 185, and the wall 185 is a distance x from the camera 150. An illuminated point 158 is a height y above the height of the camera 150, and a light ray 152 reflects from the point 158 to the camera 150. Another wall 188 is a distance x' from the camera with a light ray 153 reflecting to the camera.

The vehicle also includes a second light emitter 165 that produces downward rays 167 parallel to the central axis at a radius r from the central axis. In some examples, the rays 167 are continuous around the entire circumference, thereby forming a cylindrical ray that impinges on a floor 180. In some examples, the light emitter 165 is formed with a central laser source and reflectors (e.g., mirrors, prisms) axially or along the circumference to direct the rays downward. In some embodiments, a number of discrete rays 167 are generated by separate laser sources. In the cross section shown in FIG. 1, the light rays 167 intercept the floor 180 at points 168.

The vehicle includes a camera 160 that points downward from a point of view on the central axis. Reflected light rays 162 pass from the points 168 on the floor to the camera 160. In the illustration, the camera 160 is at a height h above the floor.

Figure 2:
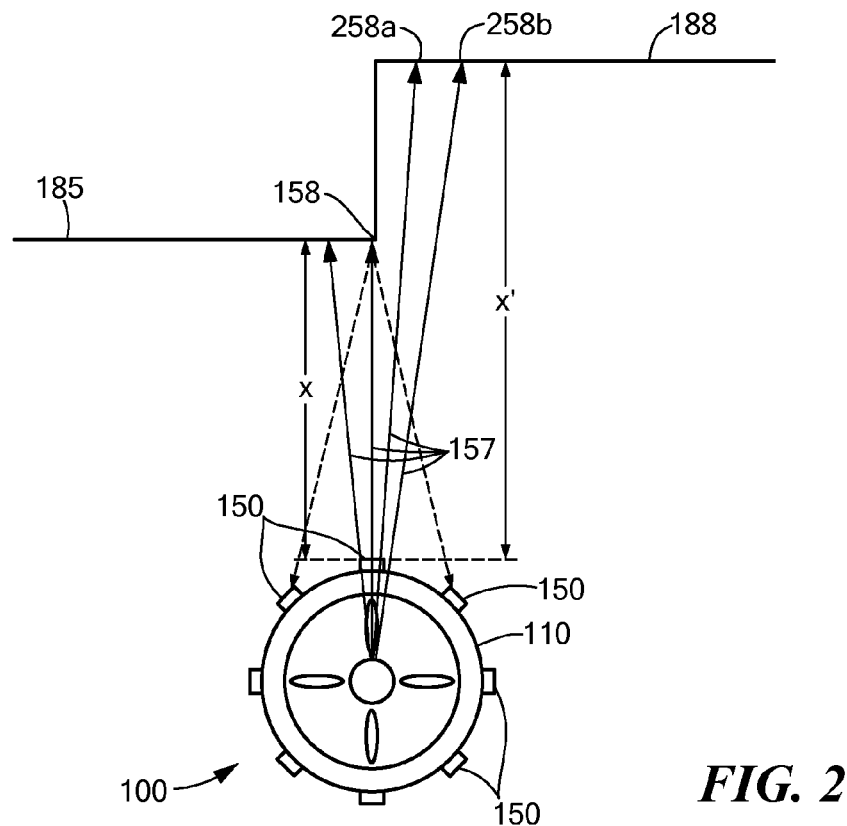
FIG. 2 is a top view corresponding to FIG. 1.

Referring to FIG. 2, a top view of the vehicle 100 shown in FIG. 1 shows the cylindrical body 110 of the vehicle, and the arrangement of eight cameras 150 around the periphery of the body. The walls 185, 188 form a corner such that the wall 185 is a distance x from the camera 150 and the wall 188 is a distance x' from the camera. Representative rays 157 (of the full planar ray that emits in all directions) are shown in the figure.

Figure 3:
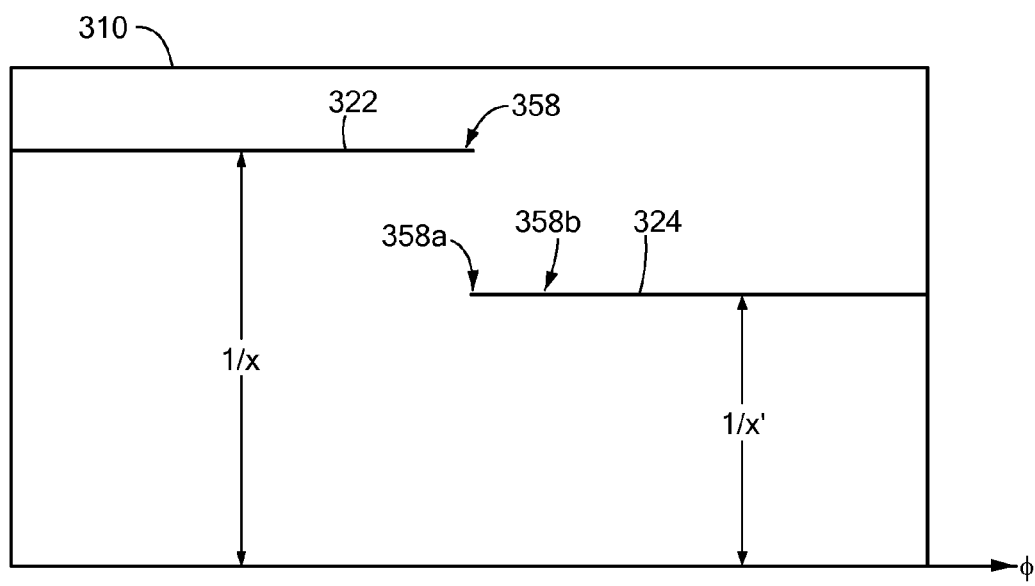
FIG. 3 is a schematic diagram of a side image sensor output.

Referring to FIG. 3, a portion of a panoramic image 310 (e.g., less than 90 degrees for the panorama) formed from the images from the set of cameras 150 shows the image of the ray 157 as an interrupted line, with a line 322 corresponding to the reflection from the wall 185 and a line 324 corresponding to the reflection from the wall 188. Referring to the geometry shown in FIG. 1, the height of the line 322 is proportional to $$\frac{1}{x}$$

and the height of the line 324 is proportional to $$\frac{1}{x'}.$$

To the extent that the height of the refection can be located in the panoramic image, the distance from the central axes to the wall on the plane of the light ray 157 can be determined from the panoramic image as a function of the angle φ around the central axis. A procedure for combining the separate images from each of the cameras 150 to form a panoramic image is discussed further later in this document.

Referring again to FIG. 1, when the vehicle's central axis is perpendicular to the floor 180, the downward rays 167 intersect the floor to form a circle. The radius of the circle remains constant but the image of the circle is proportional to $$\frac{1}{h}$$

such that as the vehicle rises, the image of the circle appears to grow smaller. Therefore, the radius of the circle provides a measure of altitude of the vehicle above the floor.

Figure 4:
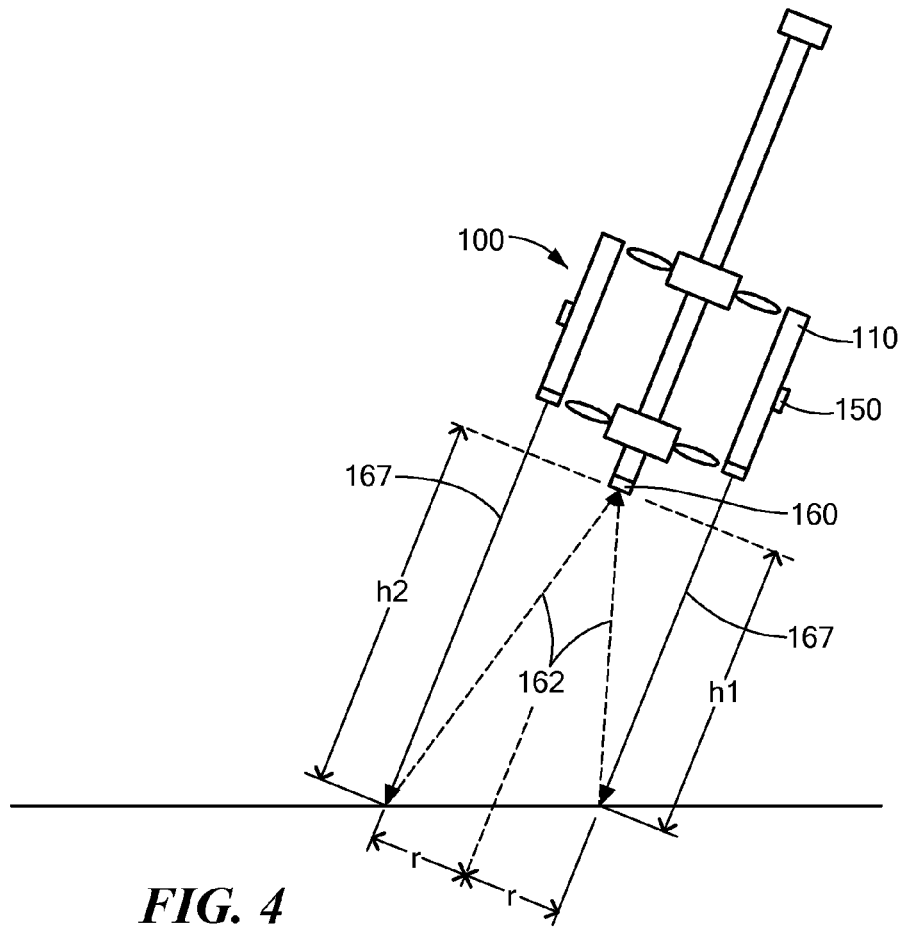
FIG. 4 is a side cross-sectional view of the aerial vehicle is a second pose.
Figure 5:
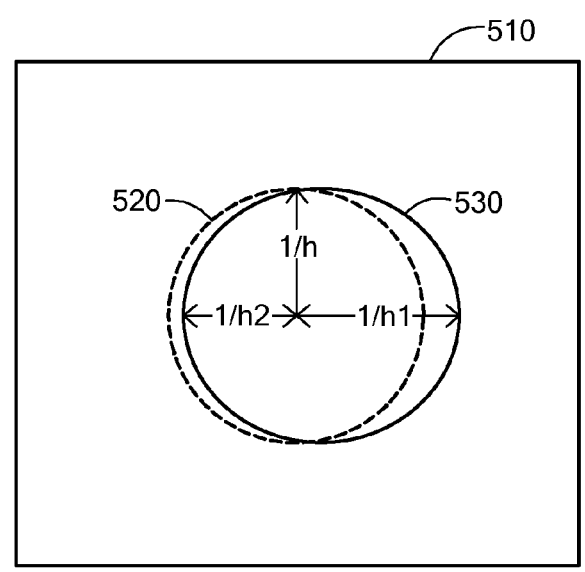
FIG. 5 is a schematic diagram of a bottom image sensor output.

Referring to FIG. 4, when the vehicle 100 is tilted, the downward rays do not intercept the floor in a circle. Referring to FIG. 5, when in a vertical pose at a height h, the image of the circle 520 have a radius $$\frac{1}{h}.$$

When the vehicle is tilted the intersection of the light rays 167 forms an ellipse on the floor. With heights are h1 and h2 at the two intersecting points in the cross section shown in FIG. 4, the image of the ellipse 530 has a major axis extending $$\frac{1}{h1}$$

in one direction and $$\frac{1}{h2}$$

in the other direction from the central point of the image 510.

Generally, in some examples, the images of the cameras are used to provide estimates of range (x) as a function of direction relative to the vehicle ($\phi$) and altitude (h) as a function of direction ($\phi$) along the circumference of the body. In some examples, the images are processed to derive features, such as distance to discontinuities or discontinuities in direction of the horizontal lines that correspond to corners of walls, or average altitude assuming a planar floor, direction and magnitude of tilt of the vehicle.

In some examples, the cameras are lightweight CMOS imagers, such as or similar to those used in digital cameras or cameras in cellular telephones. In some examples, the imagers are direct digital bus compatible and are physically smaller than other alternatives, such as CCD based imagers. A specific example used in some embodiments is an Omnivision OV10620, which has over 100 dB of luminance dynamic range. Peak quantum efficiency exceeds 35% in the 980 nm IR spectrum, which coupled with the imagers low light performance, allows the use of narrow bandwidth optical filters (≤7 nm) to perform well in direct sunlight applications.

Figure 6:
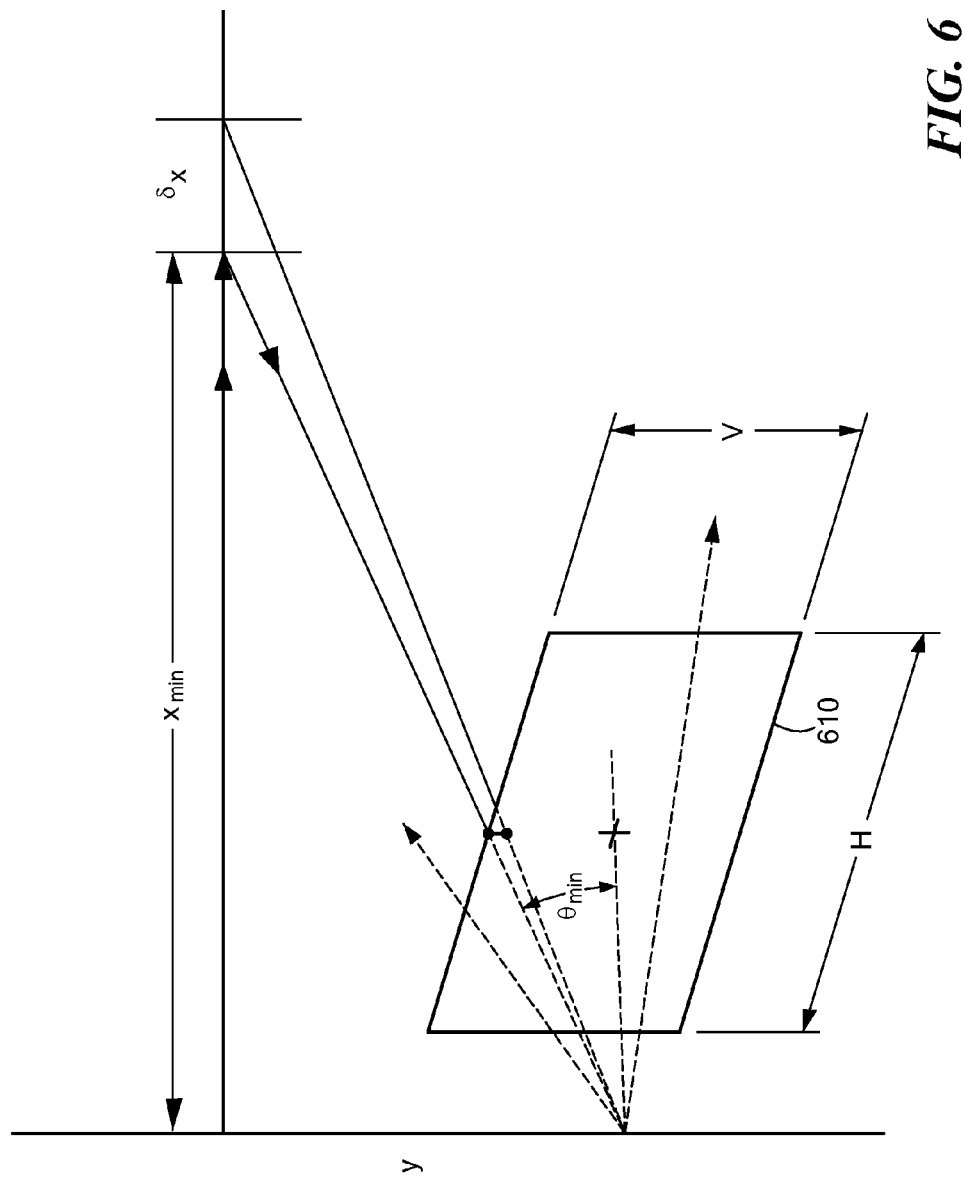
FIG. 6 is a diagram that illustrates sideways imaging.

The Omnivision 10620 imager has a pixel resolution of H×V=768×506. The distance sensing resolution of the system can be understood by considering the effect of a one-pixel vertical displacement in an image. Referring to FIG. 6, a representative camera image 610 is shown such that the image of the reflected point appears at a top pixel location of the image when the distance to the wall is $x_{min}$. For the sake of illustration, if we assume that the distance from the optical centerline to the ray plane (y) is 0.4 m, and that the reflected point is approximately $\theta_{min}$=22° above the optical centerline when the wall is at the distance $x_{min}$ then $x_{min}$≈0.4 m/tan 22°≈1.0 m. At this minimum distance, one pixel difference vertically corresponds to approximately 4 mm. This resolution goes down approximately proportionally to $x^2$ so that at a distance of x=10 m, in this illustrative example, one pixel vertical difference corresponds to approximately 40 cm.

Note also that in an example in which eight cameras are disposed about the circumference of the vehicle, each camera is responsible for at least 45 degrees of view, and the cameras have overlapping fields to provide continuity and calibration as described below. For example, in the illustrative example above in which V/2=253 pixels correspond to 22 degrees, then H=768 pixels corresponds to about 63 degrees, providing about 9 degrees of overlap on each edge.

Note that because of the geometry of the camera sensors, for reflected points in images displaced horizontally by an angle $\phi$ from the optical centerline, the pixel height of the image of the reflection is not proportional to $$\frac{1}{x}$$

but rather $$\frac{\cos\phi}{x}.$$

That is, a circular wall a constant distance from the vehicle does not result in a straight horizontal line on the sensor image.

In some embodiments, an image processing step is performed to transform the individual sensor images to form a panorama image that compensates for the distortions inherent in geometry. In some embodiments, a calibration step is performed such that each pixel (h, v) maps to a particular angle and range ($\phi$, x).

In one example of calibration, the vehicle is place such that its central axis is aligned in a cylinder that has a calibrated diameter (e.g., 2 m), and optionally includes calibrations for the angle $\phi$ about the circle. During the calibration phase, images are acquired and the (h, v)→($\phi$, x) map is computed for each sensor. This calibration can account for various unknown parameters for each of the cameras, such as the deviation of the optical axis and skew around that axis as compared to a precise positioning of the cameras. This can relieve the precision with which the cameras are mounted to the vehicle body. In some examples of calibration, the overlapping portions of the camera images are used in the calibration process.

A similar calibration process is used for the downward facing sensor, to establish the image pixel ($h_0$, $v_0$) corresponding to the image of a point on the central axis, and an orientation of the sensor around the central axis ($\phi_0$), and an image radius corresponding to a standard height (e.g., 1 m).

In some embodiments, the sensor images are used as inputs to a controller that provides control signals to the control surfaces of the vehicle. Periodically, for example, 24-60 times per second, the images are acquired concurrently by all the cameras and the images are transferred over a bus (e.g., by DMA access) to a processor (e.g., an NXP3250 multimedia processor or a DSP Digital Signal Processor) on the vehicle that processes the images.

The image processing includes detecting the locations of the reflection points in the images. In some examples, the processing also includes identifying features of the reflections, for example, discontinuities of various types that may correspond to corners in walls or floors. The locations for the reflection points are then provided as inputs to a control algorithm, which in some examples implements an extended Kalman Filter. Generally, the Kalman Filter makes use to a current estimate of the location and orientation of the vehicle to form differences between the inputs (such as ($\phi$, x) pairs from the sideways looking sensors) and the predicted values based on the estimate.

In some embodiments, the image sensor signals are used in calibration of inertial sensors, for example, to compensate for drift in the inertial sensors on an ongoing basis.

In some examples, a Simultaneous Localization and Mapping (SLAM) approach is used in which the vehicle builds up a map of the environment while at the same time localizing its location in the map.

Figure 7:
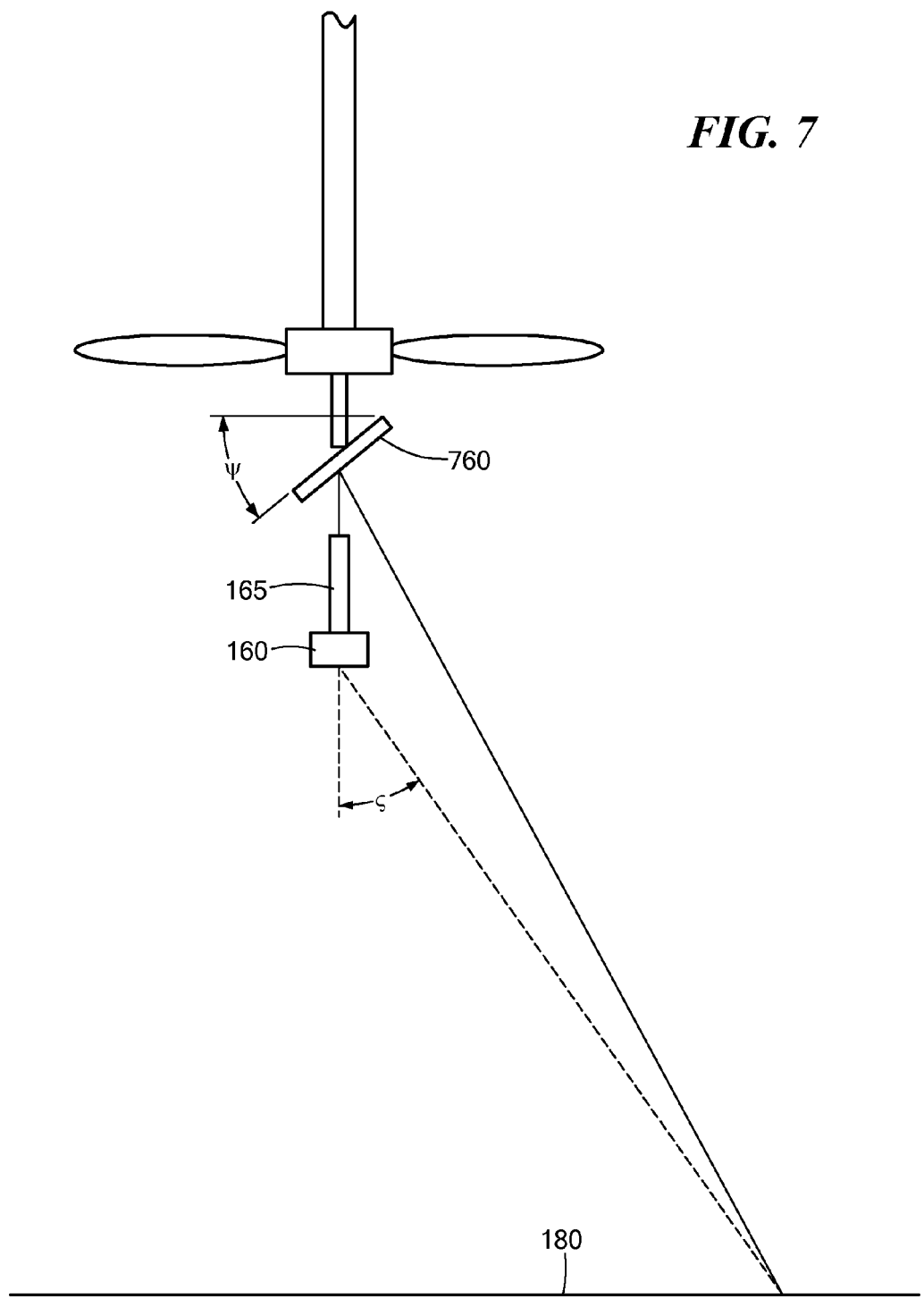
FIG. 7 is a diagram showing a laser generator means or projecting downward circles or horizontal lines from an aerial vehicle.

FIG. 7 shows is a means for utilizing the existing rotational elements of an aerial vehicle to create a lightweight and low cost laser pattern generator by affixing a reflective mirror 760 to a propeller rotational element (e.g., below the propellers as illustrated, or alternatively above the propellers) so that the mirror rotates along with the mirror, for example, at the same rotation speed. A collimated light (or holographically generated structured light pattern) is directed from a light source 160 at the mirror 760. By selecting the mirror mounting angle ψ, a range of downward projecting cones intersecting the ground is achieved. By making ψ nearly 45 degrees, a horizontal planar ray perpendicular to the rotation axis is likewise generated. The laser light source 160 can be mounted either on axis as shown, or alternatively substantially off axis without loss of effectiveness. As long as the field of view (FOV) optical angle of downward imager 165 is different from the projected angle cone of light ρ there exists a unique solution to calculate both vehicle height and vehicle attitude as before.

In some embodiments, other patterns for illumination are used. For instance, the sideways and/or downward rays form cones rather than planes and cylinders, respectively. In some embodiments, the sideways projecting rays form two or more lines on the walls, for example, by projecting two planes of rays at different vertical displacements, or by projecting rays on one or more cones that are symmetrical about the central axis of the vehicle. In other embodiments, other forms of light patterns are used, for example, by using holographic projections techniques.

The techniques described above are not necessary limited for use on an aerial vehicle. For example, the cameras described above may be affixed to a shaft that is carried in a generally vertical orientation, affixed to a helmet, ground robot, etc. The processing of the sensor inputs can then be used for a SLAM algorithm that builds a map of an interior space (e.g., the interior of a building), and maintains an estimate of a location within the building.

In some examples, the processing steps described above are implemented in software on a computer readable medium (e.g., disk, non-volatile semiconductor memory etc.) that includes instructions that control execution of a computer processor, for instance a general purpose processor, microprocessor, digital signal processor, and/or multimedia processor. In some examples, some steps are performed using hardware, for instance, using application specific integrated circuits (ASICs).

In some examples, the processing is distributed between multiple locations, for example, being distributed between the aerial vehicle and a control location that is in communication with the vehicle, for instance, over a micro-filament communication link. For example, image processing may be performed on the vehicle, with distance estimates being sent to the control location for ongoing calibration of vehicle-based sensors.

It is to be understood that the foregoing description is intended to illustrate and not to limit the scope of the invention, which is defined by the scope of the appended claims. Other embodiments are within the scope of the following claims.

What is claimed is:

1. An apparatus comprising mobile part, the mobile part comprising:
   a first light emitter for forming a first light emission comprising a plurality of emitted rays, each ray being emitted in a direction along one of a plurality of lines parallel to a central axis of the mobile part or divergent from a common point on said axis, the plurality of rays exhibiting a symmetry about said axis; and
   a first imager for acquiring images from a point of view along the central axis showing an illumination pattern at intersections of the emitted rays and a first surface upon which the first light emission impinges;
   wherein the apparatus further includes a first estimator for processing the acquired images and using the acquired images to determine at least one of (a) an orientation of the central axis of the apparatus with respect to the first surface, and (b) a distance from the surface along the central axis.

2. The apparatus of claim 1 wherein the mobile part comprises an aerial vehicle, and wherein the apparatus further comprises a module configured to be responsive to the determined orientation and/or distance to perform at least one function from a group of functions consisting of stabilization, calibration, localization, and mapping.

3. The apparatus of claim 2 wherein the module responsive to the determined orientation and/or distance comprises a control system configured to generate control signals for flight controls of the aerial vehicle.

4. The apparatus of claim 3 wherein the control system is configured to be responsive to the determined orientation to stabilize an orientation of the vehicle.

5. The apparatus of claim 3 wherein the control system is configured to be responsive to the determined distance to stabilize an altitude of the vehicle above the surface.

6. The apparatus of claim 1 wherein the first light emitter comprises a plurality of optical elements disposed at a fixed radius perpendicular from a point on the central axis.

7. The apparatus of claim 6 wherein the plurality of optical elements comprise a plurality of laser light sources.

8. The apparatus of claim 6 wherein the plurality of optical elements comprise a plurality reflectors, and the first light emitter further comprises a laser light source configured to reflect rays off the plurality of reflectors to form the first light emission.

9. The apparatus of claim 1 wherein the estimator is configured to determine the orientation according to an eccentricity of the illumination pattern.

10. The apparatus of claim 1 wherein the plurality of lines lie in a cone or cylinder.

11. The apparatus of claim 10 wherein the first light emitter comprises a reflector configured to rotate about the central axis, and a laser light source configured to reflect a ray off the rotating minor to form the rays in the cone that is symmetrical about the central axis.

12. The apparatus of claim 11 wherein the mobile part comprises an aerial vehicle having a propeller assembly configured to rotate about the central axis to provide lift for the aerial vehicle, and wherein the reflector is coupled to the propeller assembly to rotate with the rotation of the propeller assembly.

13. The apparatus of claim 1 wherein the mobile part further comprises:
   a second light emitter for forming a second light emission comprising a plurality of emitted rays from the central axis of the mobile part; and
   a second imager for acquiring images showing an illumination pattern at intersections of the emitted rays of the second light emission and one or more second surfaces upon which the second light emission impinges;
   wherein the apparatus comprises a second estimator for processing the acquired images for the second imager and using the acquired images to determine a location of the mobile part relative to the one or more second surfaces.

14. The apparatus of claim 13 wherein the rays of the second emission are on a plane that is perpendicular to the central axis of the mobile part.

15. The apparatus of claim 14 wherein the second imager acquires images from one or more points of view that are displaced in the direction of the central axis from the plane of the rays of the second light emission.

16. The apparatus of claim 15 wherein the estimator is configured to determine the location relative to the surface according to a displacement of the displacement in the images acquired by the second imager of the illumination pattern in a direction corresponding to the central axis.

17. The apparatus of claim 13 wherein the second imager comprises a plurality of imagers disposed about the periphery of the mobile part, and wherein the second imager is configured to combine the images of the plurality of imagers to form an imaging including all directions extending from the central axis.

18. The apparatus of claim 13 wherein the second estimator is configured to be responsive to the location to perform at least one function from a group of functions consisting of stabilization, calibration, localization, and mapping.

19. The apparatus of claim 1 wherein the first estimator is implemented in the mobile part of the apparatus.

20. The apparatus of claim 1 wherein the mobile part comprises an aerial vehicle that is tethered to a control station, and wherein the first estimator is implemented at least in part at the control station.

21. The apparatus of claim 1 wherein the estimator is configured to determine the distance according to a size of the illumination pattern.

22. A method for calibrating an image-guided apparatus, comprising:
    placing the apparatus in a calibration unit, the calibration unit having a substantially cylindrical inner surface, the apparatus being placed to align a central axis of the apparatus with the central axis of the cylinder;
    emitting a light emission from a light emitter affixed to the apparatus, the light emission comprising rays in a symmetrical pattern about the central axis, the rays impinging on the inner surface of the cylinder;
    acquiring images from an imager affixed to the apparatus, the images showing an illumination pattern at intersections of the emitted rays and the inner surface of the cylinder; and
    calibrating an estimator of the apparatus according to known dimensions of the calibration unit and the illumination pattern.

\* \* \* \* \*